(12) United States Patent
Sharma et al.

(10) Patent No.: US 11,785,038 B2
(45) Date of Patent: Oct. 10, 2023

(54) TRANSFER LEARNING PLATFORM FOR IMPROVED MOBILE ENTERPRISE SECURITY

(71) Applicant: International Business Machines Corporation, Armonk, NY (US)

(72) Inventors: Puneet Sharma, Bangalore (IN); Rajesh Phillips, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/216,820

(22) Filed: Mar. 30, 2021

(65) Prior Publication Data

US 2022/0321590 A1 Oct. 6, 2022

(51) Int. Cl.
*H04L 29/00* (2006.01)
*H04L 9/40* (2022.01)

(52) U.S. Cl.
CPC .......... *H04L 63/1433* (2013.01); *H04L 63/20* (2013.01)

(58) Field of Classification Search
CPC ..... H04L 63/1433; H04L 63/20; G06N 3/045; G06N 3/08
See application file for complete search history.

(56) References Cited

U.S. PATENT DOCUMENTS

| | | | |
|---|---|---|---|
| 7,418,489 B2 | 8/2008 | Sanghvi et al. | |
| 8,615,785 B2 * | 12/2013 | Elrod | H04L 63/0227 713/192 |
| 9,531,595 B2 | 12/2016 | Lim | |
| 10,230,749 B1 * | 3/2019 | Rostami-Hesarsorkh | G06F 21/56 |
| 10,715,493 B1 * | 7/2020 | Moore | H04L 63/0263 |
| 10,735,468 B1 * | 8/2020 | Viljoen | H04L 63/145 |
| 10,771,506 B1 * | 9/2020 | Kumar | H04L 63/02 |
| 11,016,997 B1 * | 5/2021 | Huang | G06F 16/285 |

(Continued)

FOREIGN PATENT DOCUMENTS

CN 109791633 A 5/2019

OTHER PUBLICATIONS

Hu et al., "Synthesized Policies for Transfer and Adaptation across Tasks and Environments", 21 pages, Apr. 5, 2019.

(Continued)

*Primary Examiner* — Don G Zhao
(74) *Attorney, Agent, or Firm* — Mark Bergner

(57) ABSTRACT

A computer implemented system and method provide for a transfer learning platform system. The method provides an introduced enterprise security policy (IESP) to a first enterprise system. During a threat, the IESP is toggled on and off. A first change element is determined that represents a change in a logging system of the first enterprise between a first and second log element of the first enterprise captured when the IESP was toggled on and off, respectively. The IESP is provided to a second enterprise system. A second change element is determined that represents a change in a logging system of the second enterprise between a first log element of the second enterprise. The method further determines that the first and second change element are different, and, conditioned upon the determining that the second change element is different than the first change element, removes the IESP from the second enterprise system.

20 Claims, 9 Drawing Sheets

(56) References Cited

U.S. PATENT DOCUMENTS

| | | | |
|---|---|---|---|
| 11,423,072 B1* | 8/2022 | Chen | G06F 18/253 |
| 11,514,321 B1* | 11/2022 | Chen | G06N 3/08 |
| 2006/0021034 A1* | 1/2006 | Cook | H04L 63/20 726/22 |
| 2013/0254831 A1* | 9/2013 | Roach | H04W 12/082 726/1 |
| 2014/0137184 A1* | 5/2014 | Russello | G06F 21/60 726/1 |
| 2018/0096260 A1 | 4/2018 | Zimmer et al. | |
| 2018/0309788 A1* | 10/2018 | Johnson | H04L 63/10 |
| 2019/0007426 A1* | 1/2019 | Bergström | G06F 21/53 |
| 2019/0068627 A1 | 2/2019 | Thampy | |
| 2019/0098037 A1* | 3/2019 | Shenoy, Jr. | H04L 63/1441 |
| 2019/0190929 A1* | 6/2019 | Thomas | H04L 51/212 |
| 2019/0190936 A1* | 6/2019 | Thomas | H04L 51/00 |
| 2019/0238506 A1* | 8/2019 | Shaw | H04L 63/102 |
| 2019/0238538 A1* | 8/2019 | Shaw | H04L 63/0227 |
| 2019/0238591 A1* | 8/2019 | Shaw | H04L 63/0281 |
| 2019/0286994 A1 | 9/2019 | Bhoj et al. | |
| 2019/0289058 A1* | 9/2019 | Bhoj | H04L 43/0805 |
| 2019/0312843 A1* | 10/2019 | Grimm | H04L 63/0236 |
| 2019/0312887 A1* | 10/2019 | Grimm | H04L 63/145 |
| 2019/0312888 A1* | 10/2019 | Grimm | H04L 63/02 |
| 2020/0279105 A1* | 9/2020 | Muffat | G06N 3/08 |
| 2020/0285761 A1* | 9/2020 | Buck | G06F 21/604 |
| 2020/0311790 A1* | 10/2020 | Keren | G06Q 20/4016 |
| 2020/0380021 A1* | 12/2020 | Barbour | G06F 16/387 |
| 2020/0396303 A1* | 12/2020 | Webber | H04L 67/535 |
| 2021/0029164 A1* | 1/2021 | Albero | H04L 63/20 |
| 2021/0258394 A1* | 8/2021 | Webber | H04L 67/61 |
| 2021/0374162 A1* | 12/2021 | Kirdey | G06F 40/30 |
| 2022/0060507 A1* | 2/2022 | Crabtree | H04L 63/1433 |
| 2022/0094713 A1* | 3/2022 | Lee | G06F 18/214 |
| 2022/0263843 A1* | 8/2022 | Aslam | H04L 41/145 |
| 2023/0062052 A1* | 3/2023 | Sheshadri | H04L 41/22 |
| 2023/0085401 A1* | 3/2023 | Deng | G06N 3/045 |

OTHER PUBLICATIONS

Daftry S. et al., "Learning Transferable Policies for Monocular Reactive MAV Control", 9 pages, Aug. 1, 2016.

Zhao, J. et al., "Feature-Based Transfer Learning for Network Security", Milcom 2017 Track 3—Cyber Security and Trusted Computing, 7 pages, ResearchGate, Oct. 2017.

Mell, P. et al., "The NIST Definition of Cloud Computing", Recommendations of the National Institute of Standards and Technology, NIST Special Publication 800-145, 7 pages, Sep. 2011.

* cited by examiner

TRANSFER LEARNING PLATFORM FOR IMPROVED MOBILE ENTERPRISE SECURITY

BACKGROUND

Disclosed herein is a system and related method for utilizing a transfer learning platform for improved mobile enterprise security. A mobile enterprise security tool helps to ensure that adequate security is provided for mobile devices that operate within a network of the enterprise.

SUMMARY

A computer implemented method is provided for a transfer learning platform system (TLPS) comprising, using a processor, providing an introduced enterprise security policy (IESP) to a first enterprise system. During a threat, the IESP is toggled on and off. A first change element is determined that represents a change in a logging system of the first enterprise between a first log element of the first enterprise captured when the IESP was toggled on, and a second log element of the first enterprise captured when the IESP was toggled off. The method further comprises determining a second enterprise system. The IESP is provided to the second enterprise system, during an operation selected from the group consisting of the threat and a reproduction of the threat, toggling on and off the IESP on the second enterprise system. A second change element is determined that represents a change in a logging system of the second enterprise between a first log element of the second enterprise captured when the IESP on the second enterprise system was toggled on, and a second log element of the first enterprise captured when the IESP on the second enterprise system was toggled off. The method further determines that the second change element is different that the first change element, and conditioned upon the determining that the second change element is different than the first change element, removes the IESP from the second enterprise system.

An apparatus for a TLPS is also provided, comprising a memory, and a processor. The processor is configured to provide an IESP to a first enterprise system. During a threat, the processor toggles on and off the IESP. The processor then determine a first change element that represents a change in a logging system of the first enterprise between a first log element of the first enterprise captured when the IESP was toggled on, and a second log element of the first enterprise captured when the IESP was toggled off. The processor then determines a second enterprise system, provide the IESP to the second enterprise system, during an operation selected from the group consisting of the threat and a reproduction of the threat. The processor then toggles on and off the IESP on the second enterprise system, and determines a second change element that represents a change in a logging system of the second enterprise between a first log element of the second enterprise captured when the IESP on the second enterprise system was toggled on, and a second log element of the first enterprise captured when the IESP on the second enterprise system was toggled off. The processor then determines that the second change element is different that the first change element, and conditioned upon the determination that the second change element is different than the first change element, removes the IESP from the second enterprise system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general computing acronyms may be used below:

TABLE 1

General Computing Acronyms

| | |
|---|---|
| API | application program interface |
| ARM | advanced RISC machine |
| CD-ROM | compact disc ROM |
| CMS | content management system |
| CoD | capacity on demand |
| CPU | central processing unit |
| CUoD | capacity upgrade on demand |
| DPS | data processing system |
| DVD | digital versatile disk |
| EVC | expiring virtual currency (a virtual currency having an expiration date, or subject to other virtual currency usage rules; local virtual currencies with expiration dates) |
| EVCU | expiring virtual currency (units) |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| VCUR | virtual currency usage rules |
| WAN | wide-area network |

Data Processing System in General

Figure 1A:
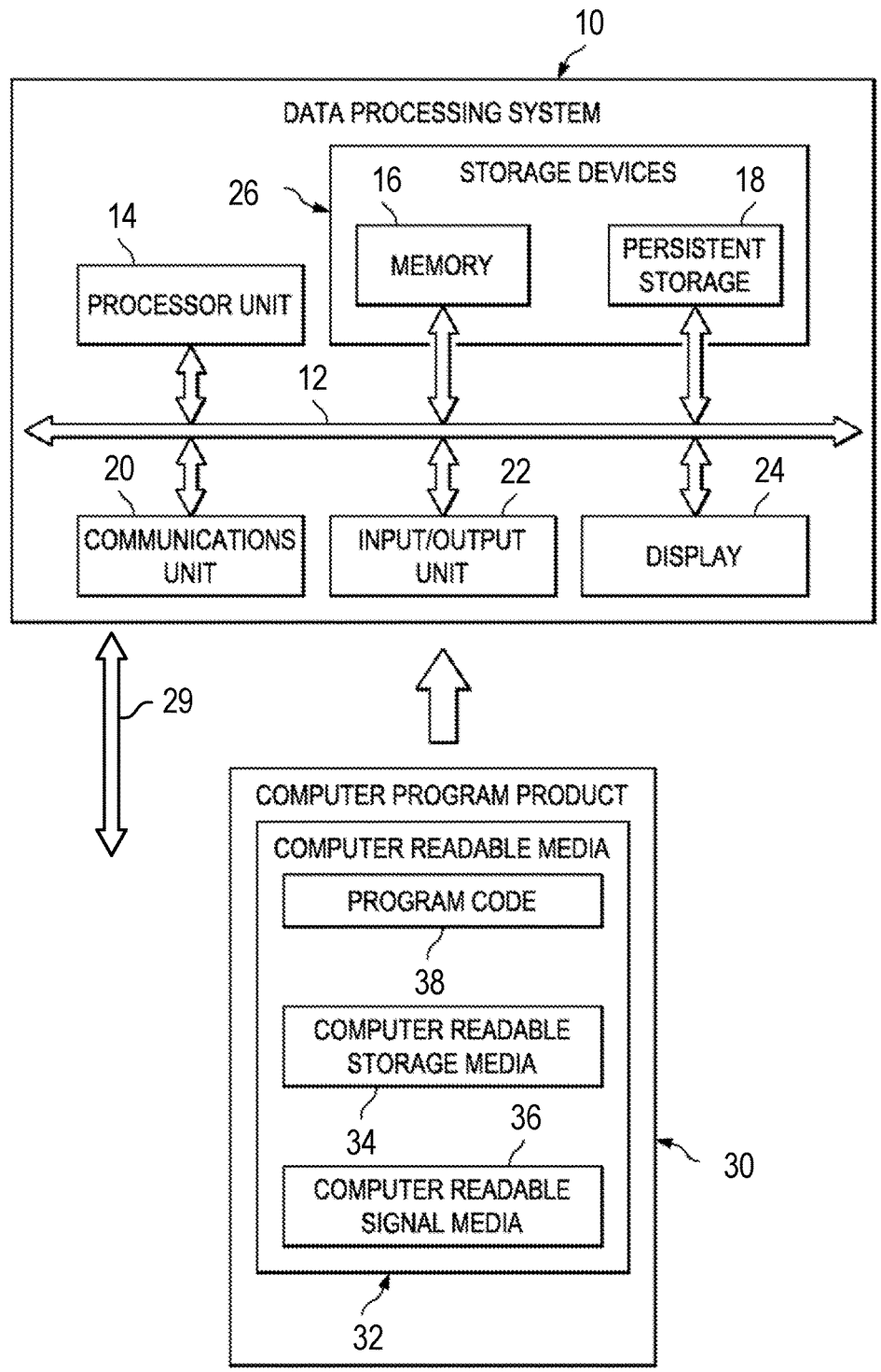
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
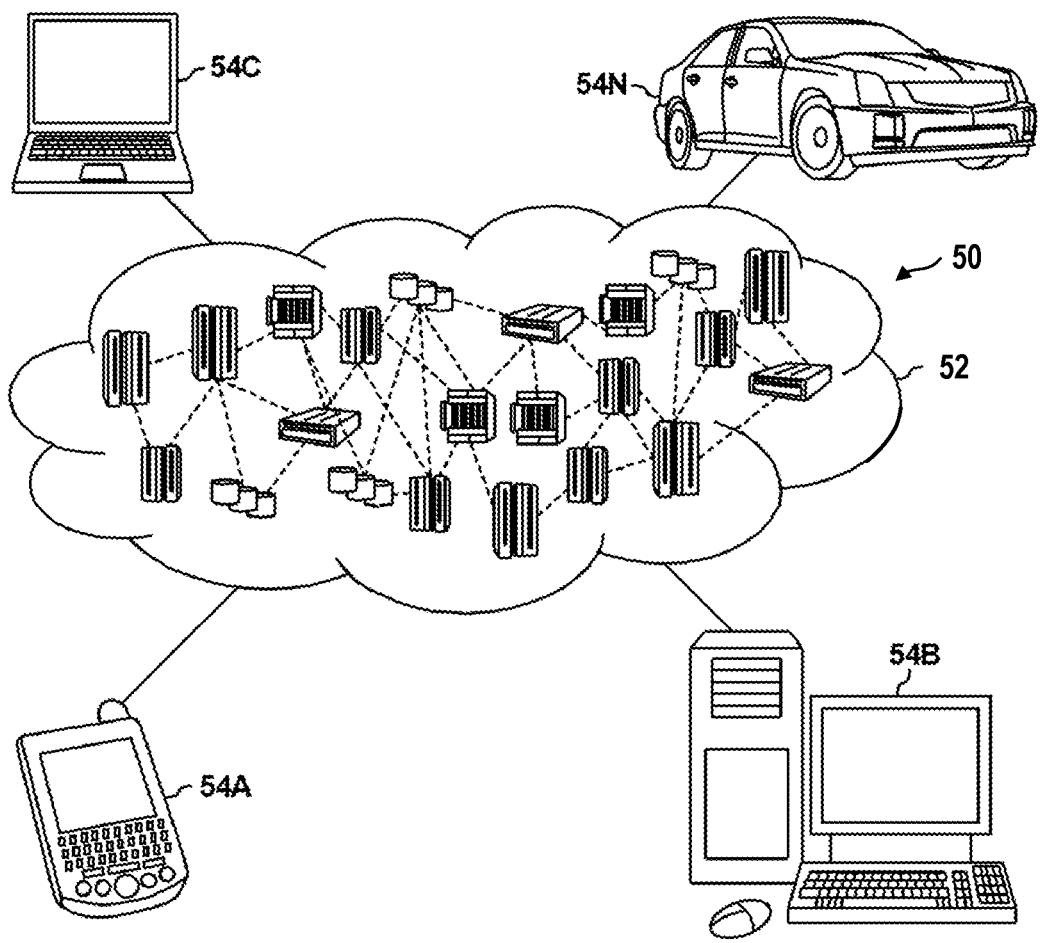
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
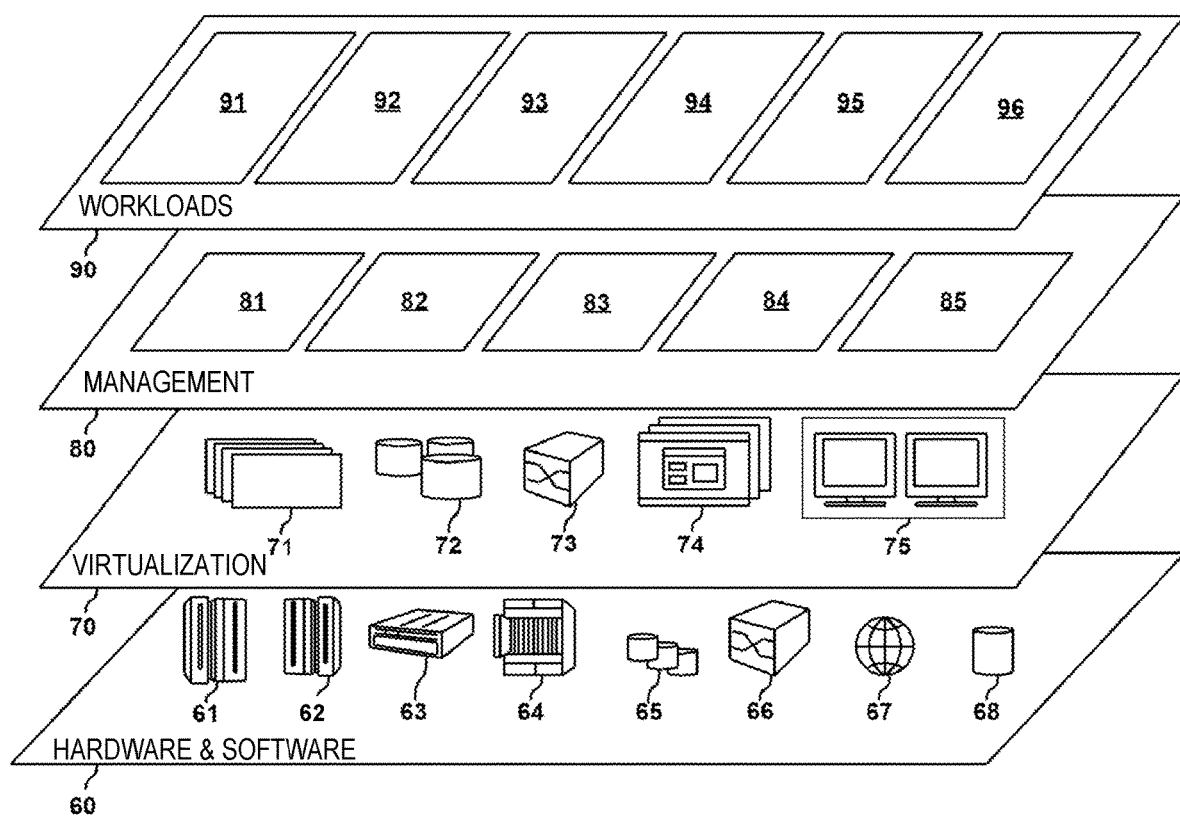
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing elements 96.

Any of the nodes 50 in the computing environment 52 as well as the computing devices 54A-N may be a DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Use of reference numbers containing letter suffixes (e.g., 250A, 250B) in a form without the suffix (e.g., 250) may represent the referenced elements collectively or representatively (depending on the context) for the sake of brevity. This may also be done where suffixes for reference numbers include primes.

Transfer Learning Platform for Improved Mobile Enterprise Security

The following application specific acronyms may be used below:

TABLE 2

Application Specific Acronyms

| | |
|---|---|
| BERT | Bidirectional Encoder Representations from Transformers |
| CBOW | Continuous Bag of Words |
| ELMo | Embeddings from Language Models |
| ESP | enterprise security policy |
| OpenAI GPT | OpenAI [artificial intelligence company] Generative Pre-Training |
| IESP | introduced enterprise security policy |
| IP | internet protocol |
| MES | mobile enterprise security |
| ML | machine learning |
| SVD | singular value decomposition |
| TLPS | transfer learning platform system |

Figure 2A:
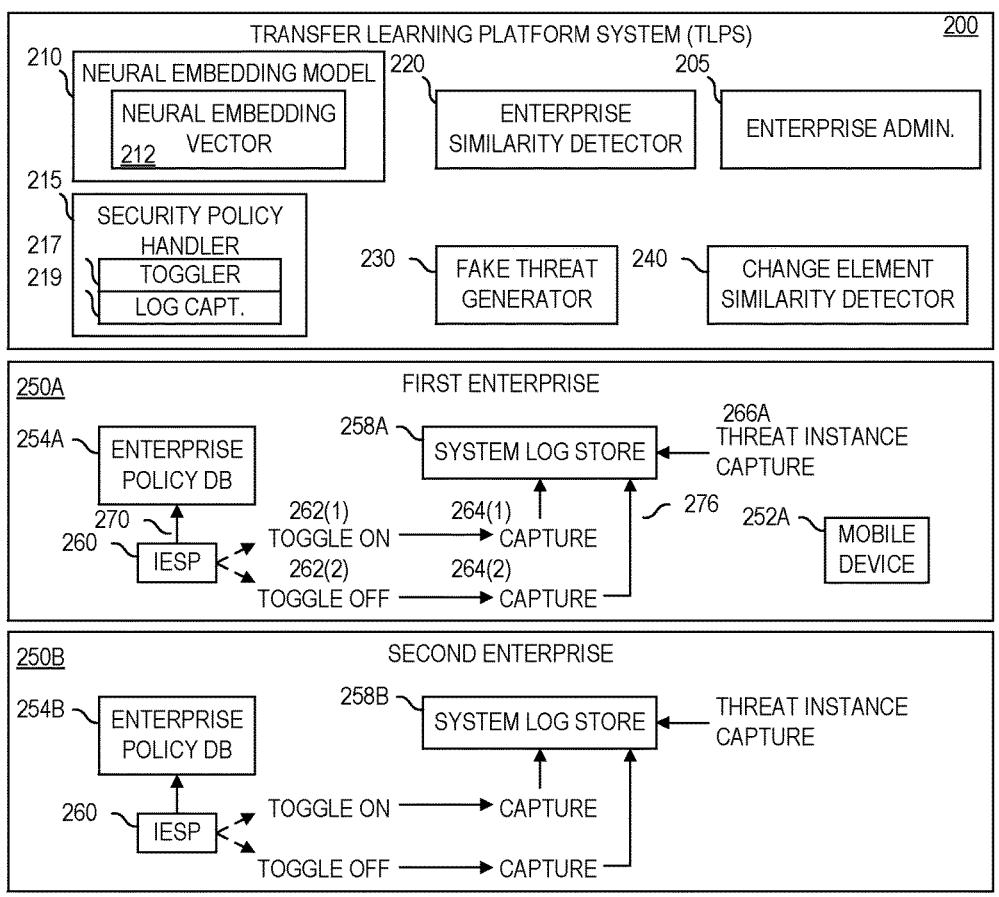
FIG. 2A is a block diagram showing major components of a transfer learning platform system (TLPS), according to some implementations.

FIG. 2A is a block diagram showing major components of a transfer learning platform system (TLPS) 200, according to some embodiments, that may be used as a mobile enterprise security tool. The TLPS 200 permits an enterprise 250, such as a first enterprise 250A and a second enterprise 250B, to configure various risk behaviors to be monitored in a mobile end-device 252A, 252B. Based on the configured ESPs in an enterprise policy database 254A, 254B, risks associated with the enterprise 250 may be identified and reported or prevented. The TLPS 200 may be implemented on a DPS 10 that exists within a cloud computing environment 52 as a cloud computing node 50. The operational components of the TLPS 200 may be implemented, in part, as the application processing elements 96. The illustration of the second enterprise 250B in FIG. 2A does not contain all of the elements shown for the first enterprise 250A, but this is done for the sake of conciseness and clarity, and the second enterprise 250B should be understood to contain elements shown for the first enterprise 250A.

At present, these risk behaviors are captured based on a manual configuration of various enterprise attributes that may be stored in the enterprise policy database 254. By way of example, a manual configuration may indicate: "Any site with the prefix 'vvv' is to be blocked", where site: "vvv: prefix" is the enterprise attribute configured manually. In some instances, it may be possible to learn such enterprise attributes from past data (and, e.g., from the same enterprise 250). However, in practice, many enterprise clients may have minimally annotated data, making it challenging to apply traditional machine learning (ML) methods. Also, different enterprises 250 may have different enterprise risk attributes. By way of example, an attribute that is risky for the finance domain may not be risky for the health-care domain. Thus, this difference in the treatment of attributes presents a challenge to apply the learning from one enterprise 250 to another. Although a simple transfer of rules across domains is known, such an approach may lead to lot of unnecessary rules getting configured.

A mobile enterprise security (MES) framework may be bootstrapped with security rules and attributes based on the domain of the enterprise 250 and chosen commercial domains. These are the default policy rules collected via crowd sourcing in the MES framework. On top of these default rules, enterprise administrators may add their own rules. Plain domain-based rule transfers are enabled—however, these tend to lead to lot of wrong transfers (false negatives/positives) since these are simply based on the domain and not on a finer environmental context.

The TLPS 200 disclosed herein addresses enabling transfer learning of security attributes between enterprises 250 leading to automatic prediction of risk attributes/policies, focusing on how to transfer learn these new rules introduced by admins across enterprises of similar domains. It is advantageous to enable this transfer learning, since any enterprise 250 with no/limited data may still bootstrap their security system based on adapted enterprise rules learned from other similar enterprises. The system enables a transfer learning of new policies (IESPs) 260 configured in one enterprise 250A across other enterprises 250B by reducing the size a matrix factorization subset selection of policies 260 in the enterprise policy database 254 by using a security policy handler 215 that triggers and leverages a toggle effect for toggling on and off an IESP 260 by a toggler 217 in the ecosystem, using a log capturer 219 that captures the effect of the toggle effect in a system log store 258A, 258B, and for correlating similarities across system log embeddings in the system log store 258 in the presence of fake injected threats that have been injected by a fake threat generator 230. The fake threat generator 230 may simulate various types of threats that might be expected from an entity posing a security threat, such as an attempt to steal credentials of a user or log in with improper credentials. A separate computer having its own IP address may be used as a source of the fake threat.

Figure 2B:
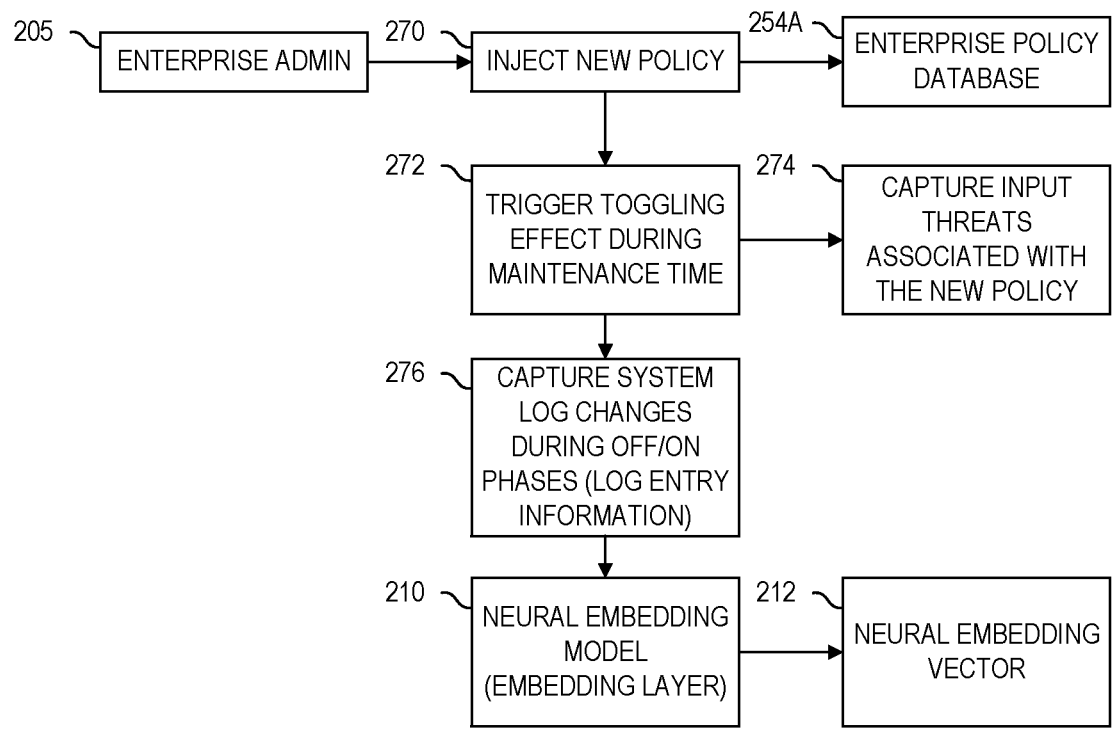
FIG. 2B is a block-flow diagram that illustrates various operations and respective components that are performed on a first enterprise system, according to some implementations.
Figure 3:
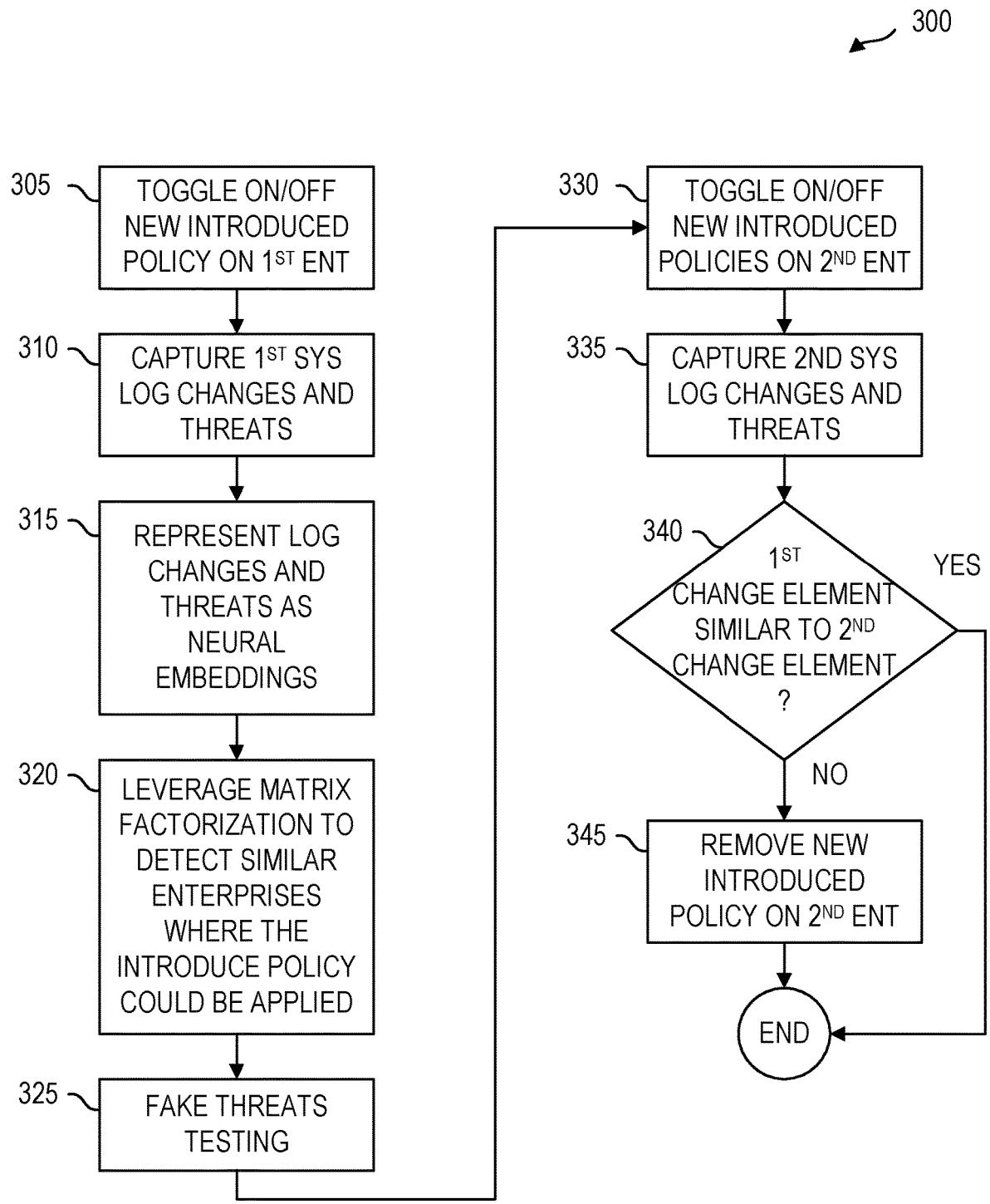
FIG. 3 is a flowchart that illustrates a process used by the transfer learning platform, according to some implementations.

Various elements shown in FIGS. 2A and 2B are discussed below in conjunction with FIG. 3. FIG. 2B is a block-flow diagram that illustrates various operations and respective components that are performed on a first enterprise system, according to some implementations. FIG. 3 is a flowchart illustrates a process 300 for operating the TLPS 200, according to some implementations.

Enterprise Security Policy

Referring to FIG. 3, the security policy handler 215 introduces (or injects) 270 a new IESP 260 into the enterprise policy database 250A of the first enterprise 250A; this portion may be (but does not have to be) done with the assistance of a user. During a maintenance time 272 (or other time that minimizes impact on operation), in operation 305, the toggler 217 toggles on the new IESP 260 (262(1)) and, in operation 310, captures system log changes 264(1) that are stored in the system log store 258A as a result of the toggle on 262(1) of the IESP 260. The toggler 217 toggles off the new IESP 260 (262(2)) and, in operation 310, captures system log changes 264(2) that are stored in the system log store 258A as a result of the toggle off 262(2) of the IESP 260.

The toggle on/off 262, as well as the capture 264 may be performed during a threat 274 (either a fake threat generated by the fake threat generator 230 or a real threat) via a threat instance capture 266A. The threat instance may be an actual threat or a fake threat that is generated by the fake threat generator 230, although the latter may provide a more controlled environment to perform the analysis. The system log store 258A thus associates the threat instance capture 266A with the log entries for the toggle on capture 264(1) and toggle off capture 264(2) 276—collectively referred to herein as log entry information. For threats that present themselves as multiple individual events, it is presumed that some of the individual events will occur during a toggle on state, and some of the individual events will occur during a toggle off state.

Log Entry-Neural Embedding Model

In operation 315, the log entry information may be transformed as an embedding layer of a neural embedding model 210 to produce a neural embedding vector 212.

Figure 4A:
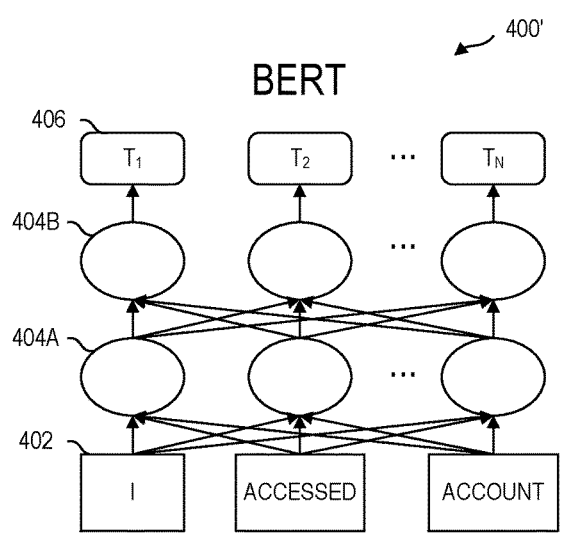
FIGS. 4A, 4B, and 4C are block diagrams that illustrate potential neural architectures for embedding constructions processes, according to some implementations.
Figure 4B:
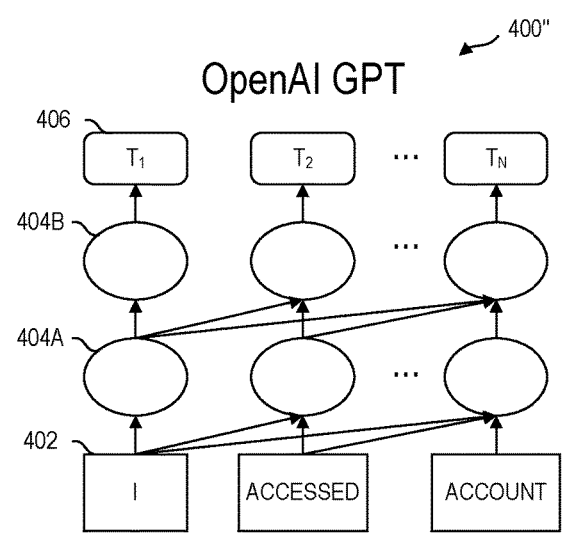
Figure 4C:
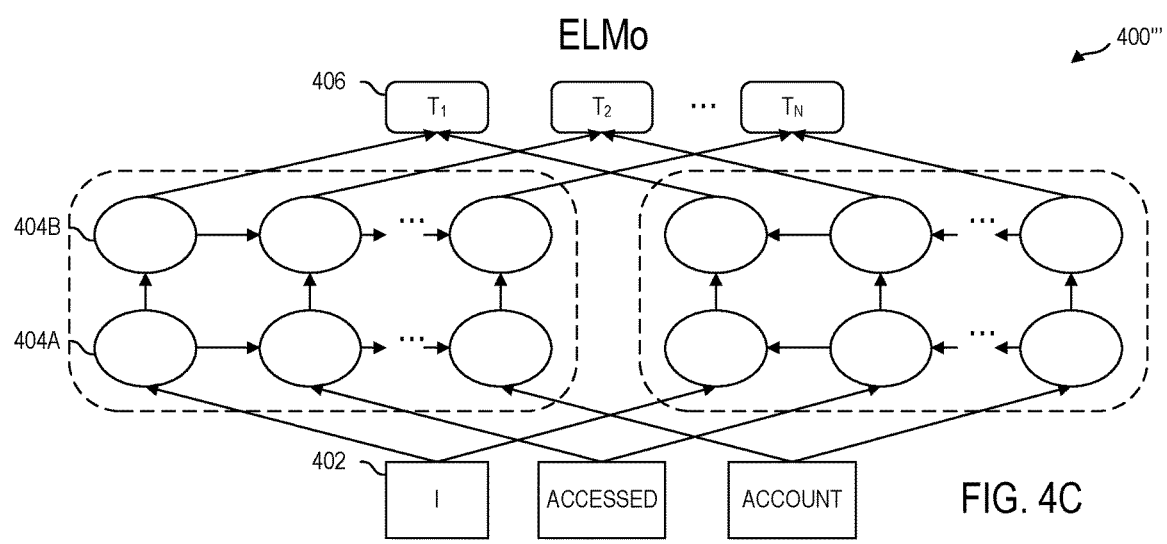

Various embedding construction processes that may be utilized. FIGS. 4A-4C illustrate different models 400', 400", 400'" that may be used. These may include, by way of example only, BERT 400', OpenAI GPT 400", ELMo 400'", and other known models not illustrated, such as Continuous Bag of Words (CBOW). Embeddings are simply (moderately) low dimensional representations of a point in a higher dimensional vector space. In the same manner, word embeddings are dense vector representations of words in lower dimensional space. Word embeddings are encountered in almost every NLP model used in practice today due to their effectiveness. By translating a word to an embedding, it becomes possible to model the semantic importance of a word in a numeric form and thus perform mathematical operations on it. This also may provide a contextual interpretation of a word.

A neural network architecture called a transformer provides advantages including a more effective modeling of long-term dependencies among tokens in a temporal sequence, and the more efficient training of the model in is done in general by eliminating a sequential dependency on previous tokens. The transformer is an encoder-decoder architecture model which uses attention mechanisms to forward a more complete picture of the whole sequence to the decoder at once rather than sequentially.

Each of the models 400 comprise a text input 402 that is provided to an input layer 404A of the neural network model 400. A final classifier layer 404B may precede the outputs $T_1, T_2 \ldots T_N$ 406. Although only two layers are shown, there may, in fact be many, many hidden layers that form a part of the neural network model 400.

The OpenAIs GPT uses a transformer-based language model with fine tuning but it uses the decoder of the transformer, thereby making the language modeling unidirectional. BERT, in contrast, builds a bidirectional transformer-based language model using encoders rather than decoders. BERT represents a general language modeling which supports transfer learning and fine-tuning on specific tasks.

The log entry information may be represented as a set of features which the embedding model 400 may learn in an unsupervised way. By way of example, various features (and any combination thereof) may be as follows: a) the state of a device (OS version, patch version, encryption level, password type, jail broken state, malicious content, etc.); b) the vulnerability exposed by a particular application installed on the device (intentional or unintentional); c) the risk level based on browsing history and network access; and d) the risk level based on the user's personal information, social network, and demographic information.

Enterprise Similarity—Matrix Factorization

In operation 320, a degree of similarity may be determined to detect similar enterprises (e.g., the second enterprise 250B) using the enterprise similarity detector 220 where the introduced policy (IESP 260) may be required or beneficial and therefore could be applied. The IESP 260 may be applied when, e.g., a measure of similarity is at or above some predefined similarity threshold. Matrix factorization is one technique that may be used to detect similar enterprises. By way of example, a movie recommender system may use matrix factorization to predict a user's interest in unseen movies, based on correlating user profiles with movie profiles. Likewise, the same technique may be adapted to predict user behavior to new unseen email tags and take appropriate actions.

Threats—Enterprise Responses

Figure 5:
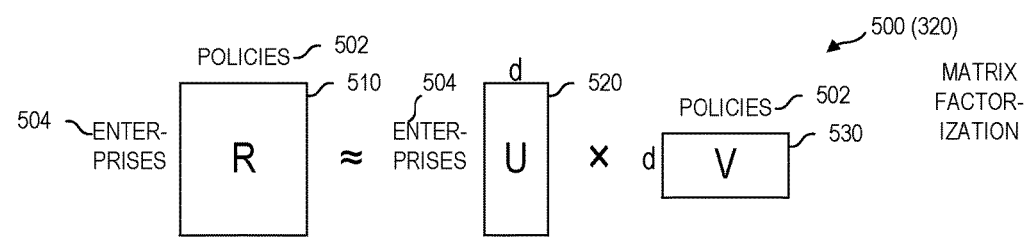
FIG. 5 is a block diagram that illustrates matrix factorization for predicting similar enterprises, according to some implementations.

FIG. 5 illustrates a matrix factorization approach 500 that may be used in operation 320 to fill empty values to make better judgements. System factors [M] may be broken down into two matrices: a) an enterprise matrix U*d 520 (where d is the number of latent features to learn) for the enterprises 504 (250); and b) a policy matrix d*V 530 for the policies 502 (IESPs 260) (where d is the number of latent features to learn). The matrix [M] may have a lot of values empty, since enterprises may not have all the policies configured.

Using an SVD approach (or any other optimization technique) the right factorization may be derived (i.e., predicting the enterprise matrix 520 and the policy matrix 530 whose dot-product matrix R 510 is very close to the initial matrix M—this may be based on, e.g., a predefined threshold that can be derived empirically, based on use cases). Then, once the enterprise matrix 520 and the policy matrix 530 are derived, by applying a dot product across them, the relevance of every policy across all enterprises 250 may be determined, even for unexplored scenarios.

In operation 325, fake threats are created (that are associated with the introduced policy) to these enterprises (e.g., the second enterprise 250B), using the fake threat generator 230. The fake threat may be sent to both the first enterprise system 250A and the second enterprise system 250B simultaneously, or at separate times. The fake threat may be a reproduction of a real threat or a previously sent fake threat. In operation 330, using the fake threats, a similar on 262(1) and off 262(2) toggling of the policy (IESP 260) that has been downloaded to, e.g., the second enterprise 250B, is performed, as described above with respect to the first enterprise 250A. In operation 335, the system log store 258B similarly captures system log changes for the on 264(1) and off 264(2) toggles. In operation 340, the change element similarity detector 240 compares the system log changes in an embedding space to determine which enterprises (250B and possibly others) have similar log changes in response to the toggling. The system log changes may be represented in a same semantic space, and the comparison may make use, e.g., of a cosine distance, although any technique of determining similarity may be utilized.

If a first change element on the first system 250A produces similar changes as the second change element on the second system 250B (340: YES), then it is known that the policy (IESP 260) is one that may be of value on the second system 250B, and is thus retained on the second system 250B. However, if a first change element on the first system 250A produces dissimilar changes as the second change element on the second system 250B (340: NO), then it is known that the policy (IESP 260) is one that may not be of value on the second system 250B, and is thus, in operation 345 removed from the second system 250B.

Figure 6:
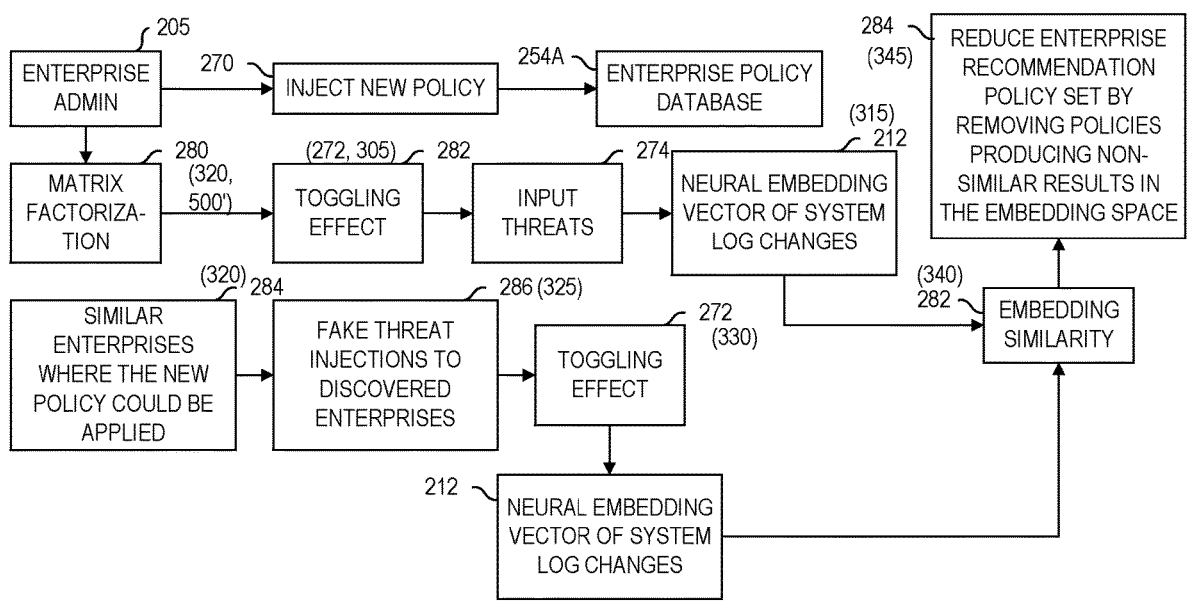
FIG. 6 is a block-flow diagram that illustrates various operations and respective components that are performed on the first and second (or additional) enterprise system(s), according to some implementations.

FIG. 6 is a block-flow diagram that illustrates various operations and respective components that are performed on the first and second (or additional) enterprise system(s), according to some implementations. FIG. 6 comprises a number of components similar to those of FIG. 2B which have been discussed in the context of the example process illustrated in FIG. 3—a detailed description is not repeated here. As can be seen in FIG. 6, and as described above, the enterprise admin 205 injects a new policy (IESP 260) 270 into the enterprise policy database 254A of the first enterprise 250A. The matrix factorization 500 is performed 280 (in operation 320), and the IESP 260 is toggled on and off 272 as fake (or real) input threats 274 are sent. The neural embedding vector of system log changes is produced 210, and these are sent as one of the inputs for the embedding similarity 282.

Similar enterprises where the new policy could be applied are determined 284 (operation 320), for example, the second enterprise 250B, and the IESP 260 is applied there as well. The same fake (or real) threats are presented to, e.g., the second enterprise 250B, and the IESP 260 is similarly toggled on the second enterprise 272 (operation 330). A neural embedding vector of the system log changes 212 is created (similar to operation 315, for the second enterprise 250B), and an embedding similarity is determined 282 (operation 340). If non-similar results are obtained 284 on the second enterprise 250B, then the IESP 260 is removed from the second enterprise (operation 345).

Use Case

The following example illustrates how the TLPS 200 may be used. Company A (the first enterprise 250A) has added a policy (IESP 260) to block uniform resource locators (URLs) with a prefix "XYZ". Using traditional collaborative filtering, the system can determine other companies (e.g., PQR, the second enterprise 250B) where the same "XYZ" prefix blocking filter (IESP 260) is to be applied. However, since the collaborative filtering technique works based on policy similarities and does not take context into account, it is possible that the PQR company 250B does not need the XYZ prefix blocking filter 260 (e.g., because it already has an exclusive list of URLs it will accept communications with)—but this filter 260 gets applied nonetheless, and thus may consume unnecessary resources for the systems of the PQR company 250B. In order to avoid this situation, the TLPS 200 enables log capture (operation 310) for Company A 250A, which captures the log changed when the XYZ prefix blocking filter 260 is toggled on and off (operation 305).

In this example, the log 258A could capture some details like "malware attack A" happened when XYZ prefix blocking filter 260 is off, and did not happen when XYZ prefix blocking filter 260 is on. Then, the TLPS 200 triggers fake threats (operation 325) to the PQR company 250B to see if similar log patterns are seen (operations 335, 340). If so (operation 340), the policy (IESP) 260 gets applied (or retained) for the PQR company 250B. Otherwise, the policy 260 does not get applied (or is removed) for the PQR company 250B.

Advantageously, the TLPS 200 does not rely upon a plain policy transfer just based on the domain and/or simple rules. It determines and incorporates the context in which the policy is required via the system and method described herein, and enables the policies only for those enterprises that the policies are relevant for, leading to reduced false positives/negatives and improving the efficiency of security operations for an enterprise.

TECHNICAL APPLICATION

The one or more embodiments disclosed herein accordingly provide an improvement to computer technology. For example, an improvement to enterprise computer security allows for a more efficient application and operation of security policies and procedures to protect computers and networks within an enterprise.

What is claimed is:

1. A computer implemented method for a transfer learning platform system (TLPS) comprising, using a processor:
providing an introduced enterprise security policy (IESP) to a first enterprise system (FES);
during a threat, toggling on and off the IESP;
determining a first change element that represents a change in a logging system of the FES between:
a first log element of the FES captured when the IESP was toggled on; and
a second log element of the FES captured when the IESP was toggled off;
determining a second enterprise system (SES);
providing the IESP to the SES;
during an operation selected from the group consisting of the threat and a reproduction of the threat, toggling on and off the IESP on the SES;
determining a second change element that represents a change in a logging system of the SES between:
a first log element of the SES captured when the IESP on the SES was toggled on; and
a second log element of the SES captured when the IESP on the second enterprise system was toggled off;
determining that the second change element is different that the first change element; and
conditioned upon the determining that the second change element is different than the first change element, removing the IESP from the SES.

2. The method of claim 1, wherein the threat is a fake threat that is sent using a fake threat generator.

3. The method of claim 1, wherein the determining of the second enterprise system comprises determining that the second enterprise system is similar, based on a predefined similarity threshold value, to the first enterprise system.

4. The method of claim 3, wherein the determining that the second enterprise system is similar to the first enterprise system uses matrix factorization.

5. The method of claim 4, wherein the matrix factorization comprises:
breaking down system factors into an enterprise matrix having a number of latent features to learn for the FES and the SES, and a policy matrix having the number of latent features to learn.

6. The method of claim 5, wherein the matrix factorization utilizes a singular value decomposition (SVD) approach to derive a factorization for predicting the enterprise matrix and the policy matrix.

7. The method of claim 1, wherein the determining of the first change element and the second change element comprises:
creating a first neural embedding vector and a second neural embedding vector in an embedding model; and
determining an embedding similarity of the first neural embedding vector and the second neural embedding vector.

8. The method of claim 7, wherein the determining of the embedding similarity comprises using a cosine distance of the first neural embedding vector and the second neural embedding vector.

9. The method of claim 7, wherein the embedding model is selected from the group consisting of Bidirectional Encoder Representation from Transformers (BERT), OpenAI Generative Pre-trained Transformer (GPT), Embeddings from Language Model (ELMo), and Continuous Bag of Words (CBOW).

10. The method of claim 1, further comprising sending a fake threat using a fake threat generator as the threat to the first enterprise system and the second enterprise system.

11. The method of claim 10, wherein the sending of the fake threat to the FES and SES is done simultaneously.

12. The method of claim 10, wherein the fake threat generator runs on its own device having its own IP address.

13. The method of claim 1, wherein the first log element and the second log element of at least one of the FES and SES are represented as a set of features from which an embedding model may learn from.

14. The method of claim 13, wherein the set of features is selected from the group consisting of a state of a device, a vulnerability exposed by an application installed on the device, a risk level based on device's activities, and a risk level based on a device user's information.

15. The method of claim 13, wherein the set of features comprises a state of a device, a vulnerability exposed by an application installed on the device, a risk level based on the device's activities, and a risk level based on a device user's information.

16. The method of claim 15, wherein:
the state of the device is selected from the group consisting of an operating system version, a patch version, an encryption level, a password type, a jail broken state, and malicious content;
the vulnerability exposed by the application installed on the device consists of an intentional vulnerability and an unintentional vulnerability;
the risk level based on the device's activities comprises activities related to browsing history and network access; and
the risk level based on a device user's information is selected from the group consisting of the user's personal information, the user's social network information, and the user's demographic information.

17. An apparatus for a transfer learning platform system (TLPS), comprising:
a memory; and
a processor that is configured to:
provide an introduced enterprise security policy (IESP) to a first enterprise system (FES);
during a threat, toggling on and off the IESP;
determine a first change element that represents a change in a logging system of the FES between:
a first log element of the FES captured when the IESP was toggled on; and
a second log element of the FES captured when the IESP was toggled off;
determine a second enterprise system (SES);
provide the IESP to the SES;
during an operation selected from the group consisting of the threat and a reproduction of the threat, toggle on and off the IESP on the SES;

determine a second change element that represents a change in a logging system of the SES between:
a first log element of the second enterprise captured when the IESP on the SES was toggled on; and
a second log element of the SES captured when the IESP on the second enterprise system was toggled off;
determine that the second change element is different that the first change element; and
conditioned upon the determination that the second change element is different than the first change element, remove the IESP from the SES.

18. The apparatus of claim 17, wherein:
the threat is a fake threat that is sent using a fake threat generator;
the determination of the second enterprise system comprises having the processor be further configured to determine that the second enterprise system is similar, based on a predefined similarity threshold value, to the first enterprise system;
the determination that the second enterprise system is similar to the first enterprise system uses matrix factorization; and
the matrix factorization comprises:
having the processor being further configured to break down system factors into an enterprise matrix having a number of latent features to learn for the first enterprise and the second enterprise, and a policy matrix having the number of latent features to learn.

19. A computer program product for a transfer learning platform system (TLPS), the computer program product comprising:
one or more computer readable storage media, and program instructions collectively stored on the one or more computer readable storage media, the program instructions comprising program instructions to:
provide an introduced enterprise security policy (IESP) to a first enterprise system (FES);
during a threat, toggling on and off the IESP;
determine a first change element that represents a change in a logging system of the FES between:
a first log element of the FES captured when the IESP was toggled on; and
a second log element of the FES captured when the IESP was toggled off;
determine a second enterprise system (SES);
provide the IESP to the SES;
during an operation selected from the group consisting of the threat and a reproduction of the threat, toggle on and off the IESP on the SES;
determine a second change element that represents a change in a logging system of the SES between:
a first log element of the SES captured when the IESP on the SES was toggled on; and
a second log element of the SES captured when the IESP on the SES was toggled off;
determine that the second change element is different that the first change element; and
conditioned upon the determination that the second change element is different than the first change element, remove the IESP from the SES.

20. The computer program product of claim 19, wherein the program instructions further configure the processor to:
for the determination of the first change element and the second change element, the instructions configure the processor to:
create a first neural embedding vector and a second neural embedding vector in an embedding model; and
determine an embedding similarity of the first neural embedding vector and the second neural embedding vector; and
for the determination of the embedding similarity, the instructions configure the processor to use a cosine distance of the first neural embedding vector and the second neural embedding vector.

* * * * *